US012739038B2

(12) United States Patent
Fukai et al.

(10) Patent No.: US 12,739,038 B2
(45) Date of Patent: Sep. 15, 2026

(54) ULTRAVIOLET LIGHT TRANSMISSION SYSTEM

(71) Applicant: NTT, Inc., Tokyo (JP)

(72) Inventors: Chisato Fukai, Musashino (JP); Tomohiro Taniguchi, Musashino (JP); Kazuhide Nakajima, Musashino (JP); Ayako Iwaki, Musashino (JP); Takashi Matsui, Musashino (JP); Nobutomo Hanzawa, Musashino (JP); Yuto Sagae, Musashino (JP); Kazutaka Hara, Musashino (JP); Atsuko Kawakita, Musashino (JP)

(73) Assignee: NTT, Inc., Tokyo (JP)

(*) Notice: Subject to any disclaimer, the term of this patent is extended or adjusted under 35 U.S.C. 154(b) by 296 days.

(21) Appl. No.: 18/290,383

(22) PCT Filed: May 19, 2021

(86) PCT No.: PCT/JP2021/019026
§ 371 (c)(1),
(2) Date: Nov. 13, 2023

(87) PCT Pub. No.: WO2022/244153
PCT Pub. Date: Nov. 24, 2022

(65) Prior Publication Data

US 2024/0250757 A1 Jul. 25, 2024

(51) Int. Cl.
*H04B 10/80* (2013.01)
*G02B 6/02* (2006.01)
(Continued)

(52) U.S. Cl.
CPC ....... *H04B 10/801* (2013.01); *G02B 6/02042* (2013.01); *G02B 6/04* (2013.01); *G02B 6/102* (2013.01)

(58) Field of Classification Search
CPC .. H04B 10/801; H04B 10/80; G02B 6/02042; G02B 6/04; G02B 6/102; G02B 6/3624
See application file for complete search history.

(56) References Cited

U.S. PATENT DOCUMENTS 9,470,842 B2 * 10/2016 Mori .................... G02B 6/4296
10,307,867 B2 * 6/2019 Hollinger ........... B23K 26/0676

FOREIGN PATENT DOCUMENTS

JP 2009189495 A 8/2009

OTHER PUBLICATIONS

Aikawa et al., "Low-loss large core fiber over wide wavelength range," IEICE Technical Report, May 2012, 112(54):35-38, 9 pages (with machine translation).

(Continued)

*Primary Examiner* — John Bedtelyon
(74) *Attorney, Agent, or Firm* — Fish & Richardson P.C.

(57) ABSTRACT

An ultraviolet optical transmission system, in which light with an ultraviolet band is transmitted along an optical transmission path formed of a quartz-based optical fiber, and includes an optical transmission unit that is switched by a rotation mechanism in which an optical transmission path of one of an optical coupling unit rotates about an axis. The optical coupling unit includes an optical transmission path including a plurality of optical transmission units on the same circumference from a center on an end surface of the optical coupling unit; an optical transmission path in which the optical transmission units are arranged on the same circumference as a circumference on which the plurality of optical transmission units are arranged; two ferrules each containing the two optical transmission paths; and a cylindrical sleeve in which the two ferrules are inserted in a hollow.

5 Claims, 12 Drawing Sheets

(51) Int. Cl.
*G02B 6/04* (2006.01)
*G02B 6/10* (2006.01)

(56) References Cited

OTHER PUBLICATIONS

Kubo, "Medical Applications of Optical Fibers," Laser Research, Apr. 1994, 22(4):329-337, 19 pages (with machine translation).
Matsuura et al., "Hollow Fibers for Laser Delivery Systems," Laser Research, Dec. 1998, 27(3):173-177, 11 pages (with machine translation).
Yoda et al., "Fiber Delivery of 20MW Laser Pulses and Its Applications," Laser Research, Jan. 2000, 28(5):309-313, 11 pages (with machine translation).

* cited by examiner

I1
I2
S1
S2
S3
S4
S5
S6
S6
S7
S8
S9

S10
S2
14
S3
S4
S5
13
S6
S7
S8
S9
S6
[3]

ULTRAVIOLET LIGHT TRANSMISSION SYSTEM

CROSS-REFERENCE TO RELATED APPLICATIONS

This application is a National Stage application under 35 U.S.C. § 371 of International Application No. PCT/JP2021/019026, having an International Filing Date of May 19, 2021.

The disclosure of the prior application is considered part of the disclosure of this application, and is incorporated by reference in its entirety into this application.

TECHNICAL FIELD

The present disclosure relates to an ultraviolet optical transmission system that transmits light in an ultraviolet band (electromagnetic waves) using an optical fiber.

BACKGROUND ART

Optical fibers are currently widely used as means for transmitting light using a light confinement effect due to differences in refractive indexes between cores and clads. In addition to information communication in which a generally well-known band from 1.3 μm to 1.6 μm is used, the optical fibers are used for laser processing (Non Patent Literature 1) and medical applications (Non Patent Literature 2).

When light in the ultraviolet band is transmitted by a quartz-based optical fiber among optical fibers, defects are generated by light induction, and absorption loss increases in the same ultraviolet band. An increase in an absorption loss due to light-induced defects is called a color center, and causes degradation of an optical fiber. Therefore, in transmission in an ultraviolet band, a hollow fiber (for example, Non Patent Literature 3) in which light-induced defects are not generated because a core of air or an inert gas is formed by applying a high reflection coating using a dielectric thin film to an inner surface of a clad, or a quartz-based optical fiber (for example, Non Patent Literature 4) in which generation of defects is prevented by adding an OH group to the core is used.

CITATION LIST

Non Patent Literature

Non Patent Literature 1: Yoda, Sano, Mukai, et al., "Transmission of 20 MW Laser-Pulse by Optical Fiber and its Applications," Laser Research, Vol. 28, No. 5. pp. 309-313, 2000

Non Patent Literature 2: Kubo, "Optical Fiber-Medical Applications," Laser Research, Vol. 22, No. 4, pp. 329-337, 1994.

Non Patent Literature 3: Matsuura, Miyagi, "Laser optical transmission By Hollow Fiber," Laser Research, Vol. 27, No. 3, pp. 173-177, 1999

Non Patent Literature 4: Aikawa, Asano, Hayashi, Miyachi,

Kudo, "Wide Wavelength Region Low Loss Large Diameter Fiber," IEICE Technical Report, OFT2012-8, pp. 35-38, 2012.

SUMMARY OF INVENTION

Technical Problem

In an optical fiber described in Non Patent Literature 3, since a refractive index of a core such as air or an inert gas is lower than a refractive index of a clad, total reflection does not occur at a boundary surface between the core and the clad, and a loss occurs at the time of reflection. Therefore, there is a problem that a transmission loss in the core of the optical fiber is greater than that of a quartz-based optical fiber (solid-core type optical fiber).

On the other hand, the quartz-based optical fiber described in Non Patent Literature 4 can inhibit generation of defects due to light induction better than a normal optical fiber having fewer OH groups. However, complete inhibition of an increase in a loss due to generation of defects may not be possible, fiber degradation due to an increase in a loss over time occurs, and periodic exchange work is required. In order to exchange optical fibers, it is necessary to release a connection state and perform reconnection.

For example, in the case of fusion connection, it is necessary to cut out a new cut surface at each connection, and there is a problem that a fiber length is shortened with each optical fiber exchanging operation. On the other hand, in the case of connector connection, a length of an optical fiber to be exchanged can be optimally set, and the fiber length is not shortened whenever the optical fiber is exchanged. However, when a use wavelength is in an ultraviolet band, it is necessary to take measures such as reliable blocking of a light source when a connector is attached or detached in order to avoid an influence on the eyes and skin. Therefore, there is a problem that a procedure for exchanging an optical fiber becomes complicated.

Accordingly, in order to solve the foregoing problems, an object of the present invention is to provide an ultraviolet optical transmission system in which cutting of an optical fiber or a complicated procedure is not necessary when an optical fiber is exchanged.

Solution to Problem

In order to achieve the foregoing object, in an ultraviolet optical transmission system according to the present invention, a plurality of transmission paths (optical fibers) of ultraviolet light are prepared in advance, and a transmission path of the ultraviolet light is selected by rotating a revolver in a connection portion between a light source and an optical output unit.

Specifically, an ultraviolet optical transmission system according to the present invention includes: a light source configured to generate ultraviolet light with an ultraviolet band;

an optical transmission unit configured to have a plurality of optical transmission paths along which the ultraviolet light propagates;

an optical output unit configured to output the ultraviolet light to outside;

a light source side optical coupling unit configured to connect the light source to the optical transmission unit; and an output side optical coupling unit configured to connect the optical transmission unit to the optical output unit, wherein the light source side optical coupling unit has a first revolver structure that couples the ultraviolet light from the light source to one of the optical transmission paths of the optical transmission units, and wherein the output side optical coupling unit has a second revolver structure that couples the ultraviolet light from the optical transmission path along which the ultraviolet light propagates to the optical output unit.

In the ultraviolet optical transmission system, a plurality of optical transmission paths between a light source and an optical output unit (optical transmission unit) are prepared, and a decrease in a loss is recovered by switching an optical transmission path to another optical transmission path when an optical transmission path which is being used deteriorates. That is, work for cutting an optical fiber is not necessary when the optical fiber is exchanged, and the fiber length can be inhibited from being shortened whenever the optical fiber is exchanged.

In the ultraviolet optical transmission system, a revolver selecting an optical transmission path is used. Thus, work for switching the optical transmission path is completed by simply rotating the revolver. That is, since a connector is not attached or detached at the time of work for switching the optical transmission path, a complicated procedure such as blocking of the light source is not necessary.

Accordingly, the present invention can provide an ultraviolet optical transmission system in which cutting of an optical fiber or a complicated procedure is not necessary when an optical fiber is exchanged.

For example, the revolver has the following structures.

The first revolver structure includes:

- a first coupling end surface on which one ends of the plurality of optical transmission paths are arranged on a circumference with a radius $r_1$ from a center;
- a second coupling end surface on which one end portion outputting the ultraviolet light from the light source is arranged on a circumference with a radius $r_1$ from a center;
- a first ferrule which holds the first coupling end surface;
- a second ferrule which holds the second coupling end surface; and
- a cylindrical first sleeve into which the first ferrule and the second ferrule are inserted such that the first and second coupling end surfaces face each other. The second revolver structure includes:
- a third coupling end surface on which the other ends of the plurality of optical transmission paths are arranged on a circumference with a radius $r_2$ from a center;
- a fourth coupling end surface on which one end portion to which the ultraviolet light from the optical transmission path is coupled is arranged on a circumference with the radius $r_2$ from the center;
- a third ferrule which holds the third coupling end surface;
- a fourth ferrule which holds the fourth coupling end surface; and
- a cylindrical second sleeve into which the third ferrule and the fourth ferrule are inserted such that the third and fourth coupling end surfaces face each other.

Further, the present ultraviolet optical transmission system further includes a rotation control unit configured to rotate at least one of the first and second coupling end surfaces in an axial direction of the first sleeve to cause one end portion of the second coupling end surface outputting the ultraviolet light from the light source and one end portion of one of the optical transmission paths in the first coupling end surface to face each other and configured to rotate at least one of the third and fourth coupling end surfaces in an axial direction of the second sleeve and cause one end portion of the fourth coupling end surface to which the ultraviolet light from the optical transmission path is coupled and the other end portion of the optical transmission path selected in the first revolver structure in the third coupling end surface to face each other.

At this time, the rotation mechanism operates the first revolver structure and the second revolver structure in conjunction with each other so that the ultraviolet light from the light source is output from the optical output unit, and selects the same optical transmission path.

The radius $r_1$ and the radius $r_2$ may have the same value or different values.

The first revolver structure and the second revolver structure have gaps between the first and second coupling end surfaces and between the third and fourth coupling end surfaces so that the optical fiber end is not rubbed during rotation.

The ultraviolet optical transmission system according to the present invention further includes a remote controller capable of remotely operating the rotation control unit.

It is not necessary for a worker to go to a site.

The optical transmission unit has the following variations.

The optical transmission unit is a multicore optical fiber, and a waveguide region of the multicore optical fiber is used as each of the optical transmission paths.

The optical transmission unit is a bundle fiber obtained by bundling multicore optical fibers, and a waveguide region of the multicore optical fiber included in the bundle fiber is used as each of the optical transmission paths.

The optical transmission unit is a multicore cable in which single fibers are bundled, and a waveguide region of the single fiber included in the multicore cable is used as each of the optical transmission paths.

Further, the waveguide region of the optical transmission unit is a solid core, a hole-assisted core, a hole structure core, a hollow core, or a coupling core.

The foregoing inventions may be combined where possible.

Advantageous Effects of Invention

The present invention can provide an ultraviolet optical transmission system in which cutting of an optical fiber or a complicated procedure is not necessary when an optical fiber is exchanged.

DESCRIPTION OF EMBODIMENTS

Figure 1:
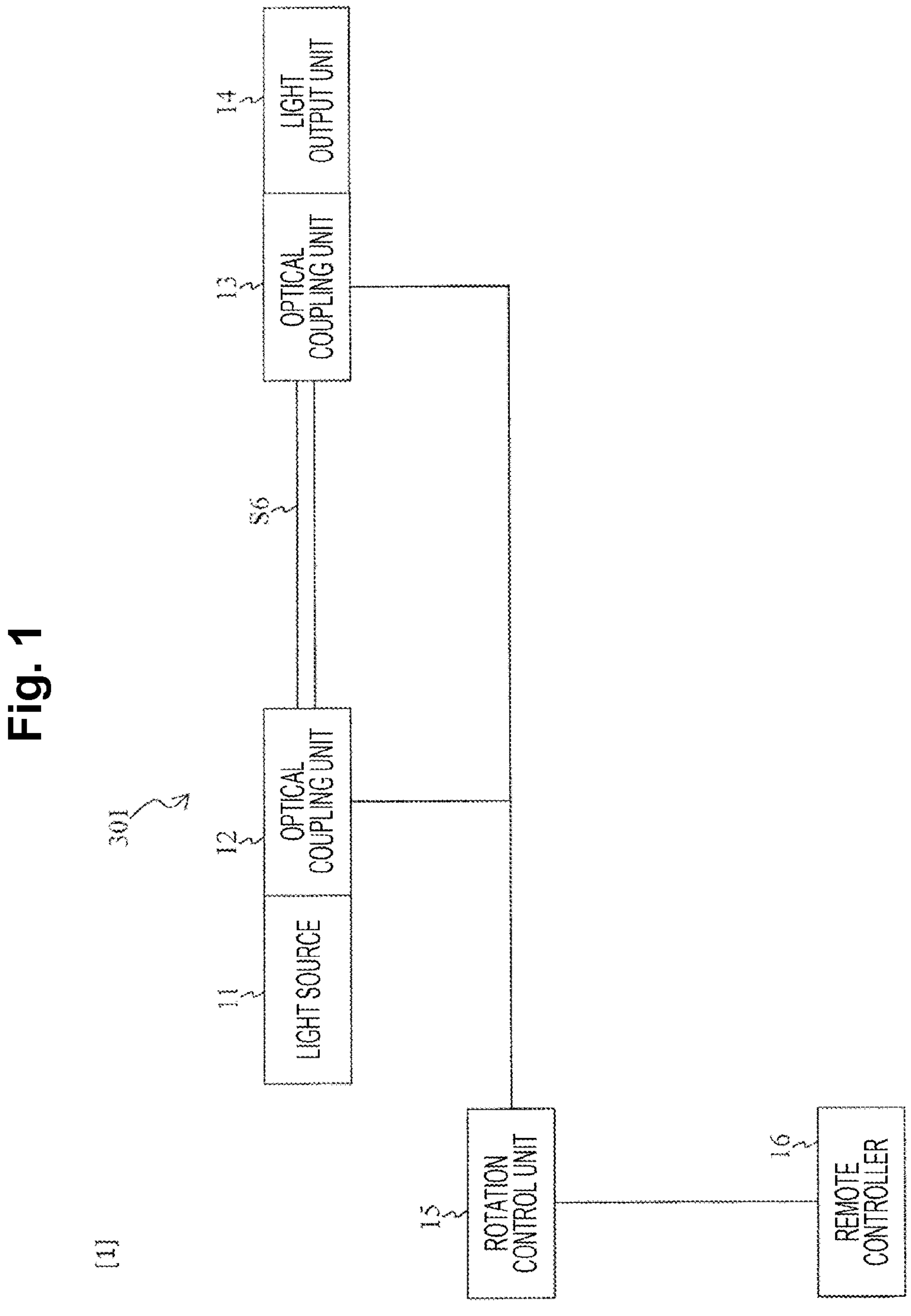
FIG. 1 is a diagram illustrating an ultraviolet optical transmission system according to the present invention.

Embodiments of the present invention will be described with reference to the accompanying drawings. The embodiments to be described below are examples of the present invention, and the present invention is not limited to the embodiments to be described below. Constituents denoted by the same reference numerals in the present specification and the drawings indicate the same constituents.

FIG. 1 is a block diagram illustrating an ultraviolet optical transmission system 301 according to the present embodiment. The ultraviolet optical transmission system 301 includes:

- a light source 11 that generates ultraviolet light with an ultraviolet band;
- an optical transmission unit S6 which has a plurality of optical transmission paths along which the ultraviolet light propagates;
- an optical output unit 14 that outputs the ultraviolet light to the outside;
- a light source side optical coupling unit 12 that connects the light source to the optical transmission unit;
- an output side optical coupling unit 13 that connects the optical transmission unit to the optical output.

The ultraviolet optical transmission system 301 may include a rotation control unit 15 and a remote controller 16 that control an operation of the optical coupling unit (12, 13).

The optical transmission unit S6 includes a multicore fiber or a bundled fiber. The optical transmission unit S6 may be a multicore cable in which single fibers are bundled. Details of the optical transmission unit S6 will be described below.

Figure 2:
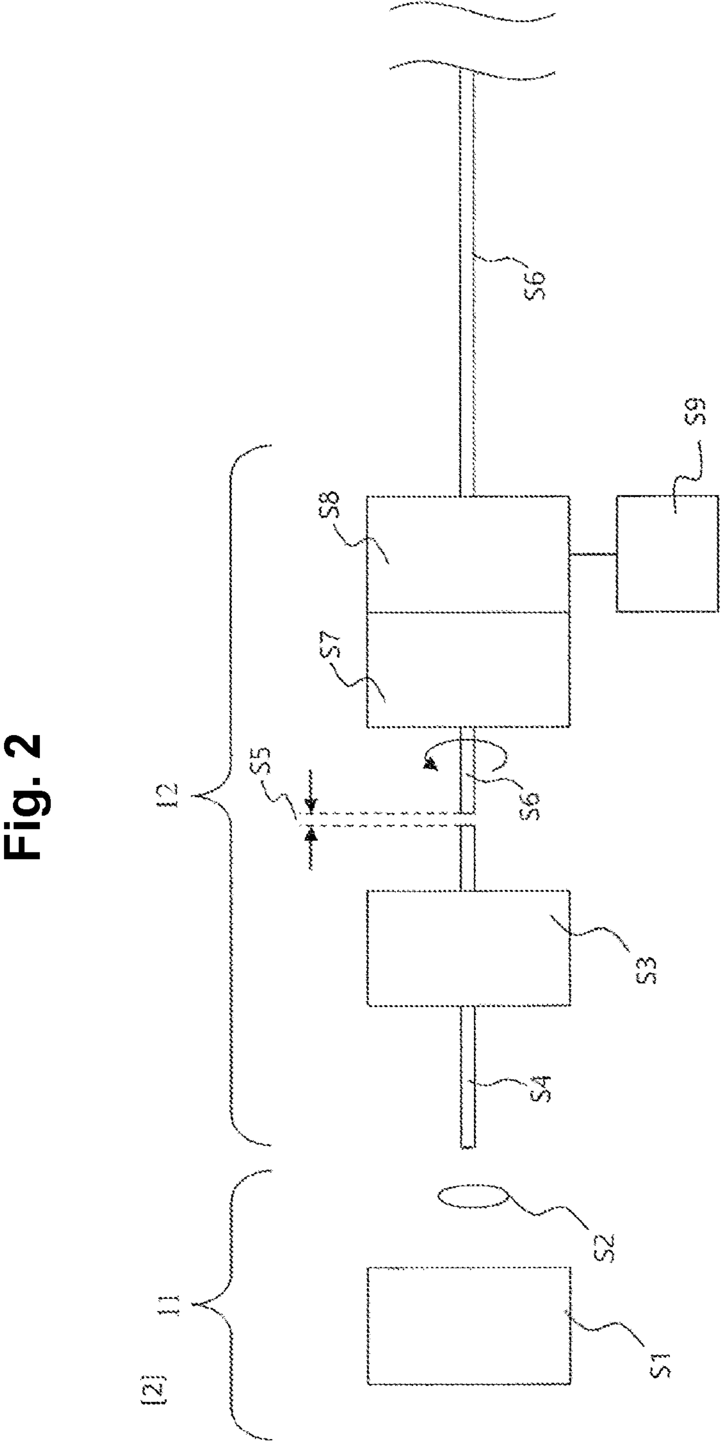
FIG. 2 is a diagram illustrating the ultraviolet optical transmission system according to the present invention.

FIG. 2 is a block diagram illustrating the light source 11 and the light source side optical coupling unit 12. The light source 11 includes a light source unit S1 and an optical system S2 such as a lens. The ultraviolet light from the light source unit S1 is incident on the optical transmission path S4 by the optical system S2. A hollow fiber or a bandgap fiber that inhibits light-induced degradation is used for the optical transmission path S4. Details of the optical transmission path S4 will be described below.

The light source side optical coupling unit 12 has a first revolver structure that couples the ultraviolet light from the light source 11 to one of the optical transmission paths of the optical transmission unit S6. Specifically, the light source side optical coupling unit 12 includes a rotation stopping mechanism S3, an optical transmission path S4, a gap S5, an optical transmission unit S6, a free rotation mechanism S7, an actuator S8, and a control circuit S9.

The optical transmission path S4 is fixed by the rotation stopping mechanism S3 not to axially rotate.

On the other hand, the free rotation mechanism S7 is attached to the optical transmission unit S6 so that the optical transmission unit S6 can rotate in the axial direction.

The actuator S8 that performs any angle rotation rotates the optical transmission unit S6 in accordance with a signal from the control circuit S9.

A gap S5 is provided between the optical transmission path S4 and the optical transmission unit S6, and does not interfere with the optical transmission path S4 even when the optical transmission unit S6 rotates.

The free rotation mechanism S7 to which the actuator S8 and the control circuit S9 are attached may be attached to the optical transmission path S4 to be rotated, and the rotation stopping mechanism S3 may be attached and fixed to the optical transmission unit S6.

The actuator S8 is a driving mechanism that rotates at appropriate angle steps in accordance with a pulse signal from the control circuit S9 and serves as a driving mechanism that has a constant static torque at each angle step. For example, a stepping motor is used. Any other method may be used, as long as the actuator S8 is a driving mechanism that rotates at appropriate angle steps in accordance with a pulse signal supplied from the control circuit S9, and has a constant static torque at each angle step. A rotation speed and a rotation angle may be determined with cycles and the number of pulses of the pulse signal from the control circuit S9, and the angle steps and a static torque may be adjusted via a reduction gear.

The static torque necessary for holding the rotation angle of the optical transmission unit S6 to which the free rotation mechanism S7 is attached is applied by the actuator S8.

Figure 3:
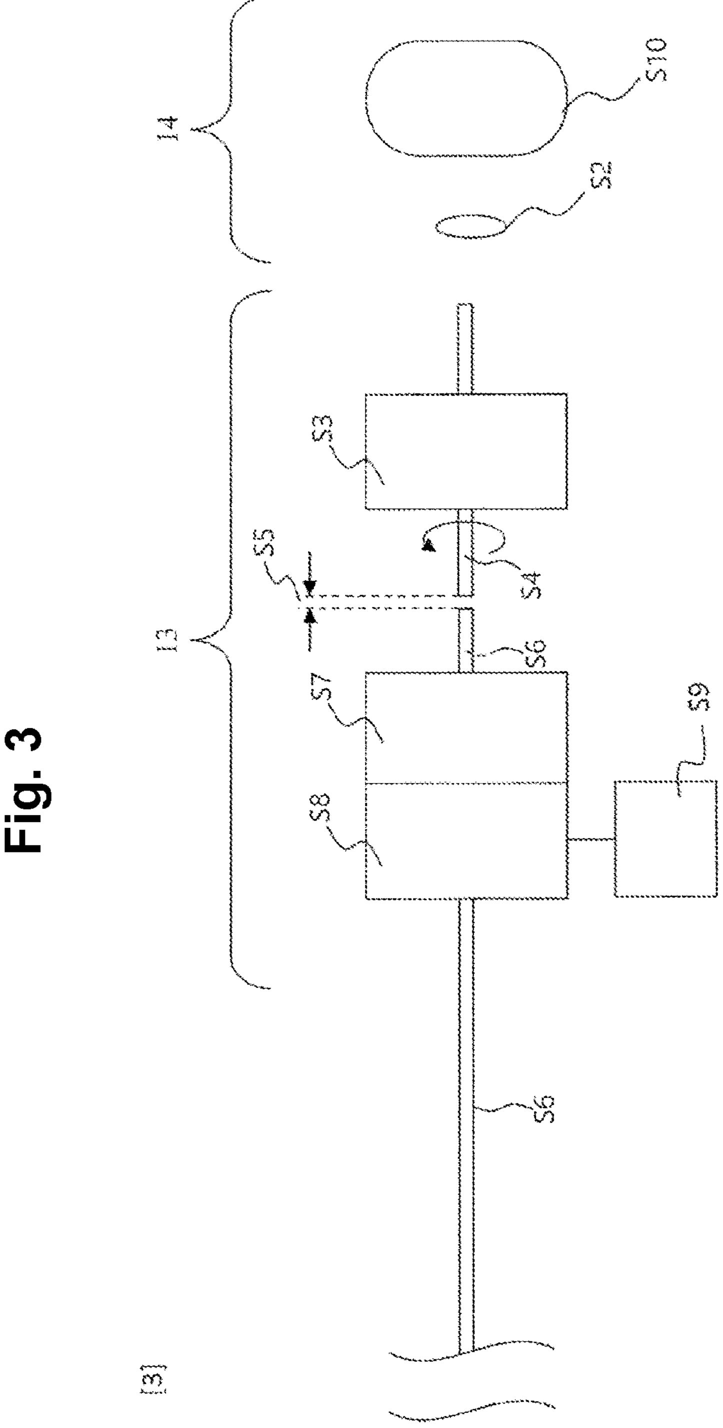
FIG. 3 is a diagram illustrating the ultraviolet optical transmission system according to the present invention.

FIG. 3 is a block diagram illustrating the output side optical coupling unit 13 and the optical output unit 14. The optical output unit 14 includes an optical system S2 such as a lens. The optical transmission path S4 is similar to that described in FIG. 2. Ultraviolet light from the light source unit S1 is emitted to the irradiation target S10 by the optical system S2. By adjusting the optical system S2 so that the irradiation target S10 can be irradiated with the ultraviolet light, decontamination is possible with ultraviolet light. Output power can be measured using a light receiving element when an irradiation destination of the ultraviolet light is set as the light receiving element, and thus transmission characteristics of the present system can be evaluated.

The output side optical coupling unit 13 has a second revolver structure that couples the ultraviolet light from the optical transmission path along which the ultraviolet light propagates to the optical output unit 14. Specifically, the output side optical coupling unit 13 includes a rotation stopping mechanism S3, an optical transmission path S4, a gap S5, an optical transmission unit S6, a free rotation mechanism S7, an actuator S8, and a control circuit S9, similarly to the configuration of the light source side optical coupling unit 12 in FIG. 2. The function of each constituent is similar to that described in FIG. 2.

Figure 4:
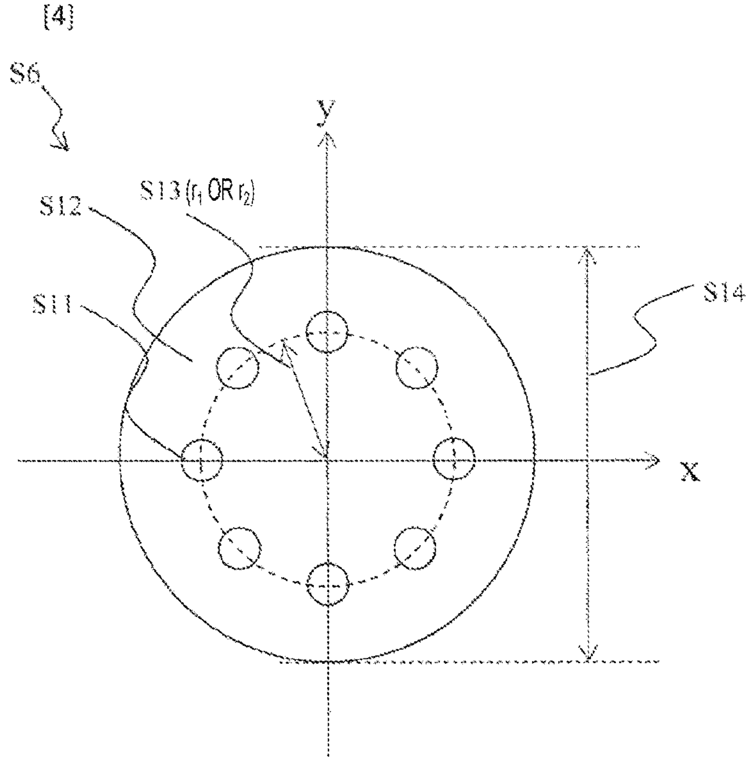
FIG. 4 is a diagram illustrating an optical transmission unit of the ultraviolet optical transmission system according to the present invention.

FIG. 4 is an example of a cross-sectional view illustrating the optical transmission unit S6. In FIG. 4, reference numeral S11 denotes a waveguide region along which ultraviolet light propagates, reference numeral S12 denotes a cladding, reference numeral S13 denotes a radius r of a circumference in which the center of the waveguide region is disposed, and reference numeral S14 denotes a diameter of the optical transmission unit S6.

In the optical transmission unit S6, the center of each of the plurality of waveguide regions S11 is arranged on the circumference of a circle that has a radius S13 ($r_1$ or $r_2$, $r_{1=12}$ (for example, in a case where the optical transmission unit S6 is a multicore fiber), or $r_1 \neq r_2$ (for example, in a case where the optical transmission unit S6 is a bundle fiber).) with respect to the center of the optical transmission unit S6. Although the optical transmission path including a total of eight waveguide regions S11 is exemplified in FIG. 4, the center of each waveguide region S11 may be arranged on the circumference of a circle that has the radius $r_1$ or $r_2$, and the number of waveguide regions S11 and the arrangement of the waveguide regions S11 of the optical transmission unit S6 are not limited thereto.

For example, the optical transmission unit S6 is a multicore optical fiber, and a waveguide region (core) of the multicore optical fiber can be used as each optical transmission path. Alternatively, the optical transmission unit S6 may be a bundle fiber in which multicore optical fibers are bundled, and a waveguide region (core) of the multicore optical fiber included in the bundle fiber may be used as each optical transmission path. Furthermore, the optical transmission unit S6 may be a multicore cable in which single fibers are bundled, and a waveguide region (core) of the single fiber included in the multicore cable may be used as each of the optical transmission paths.

Figure 5:
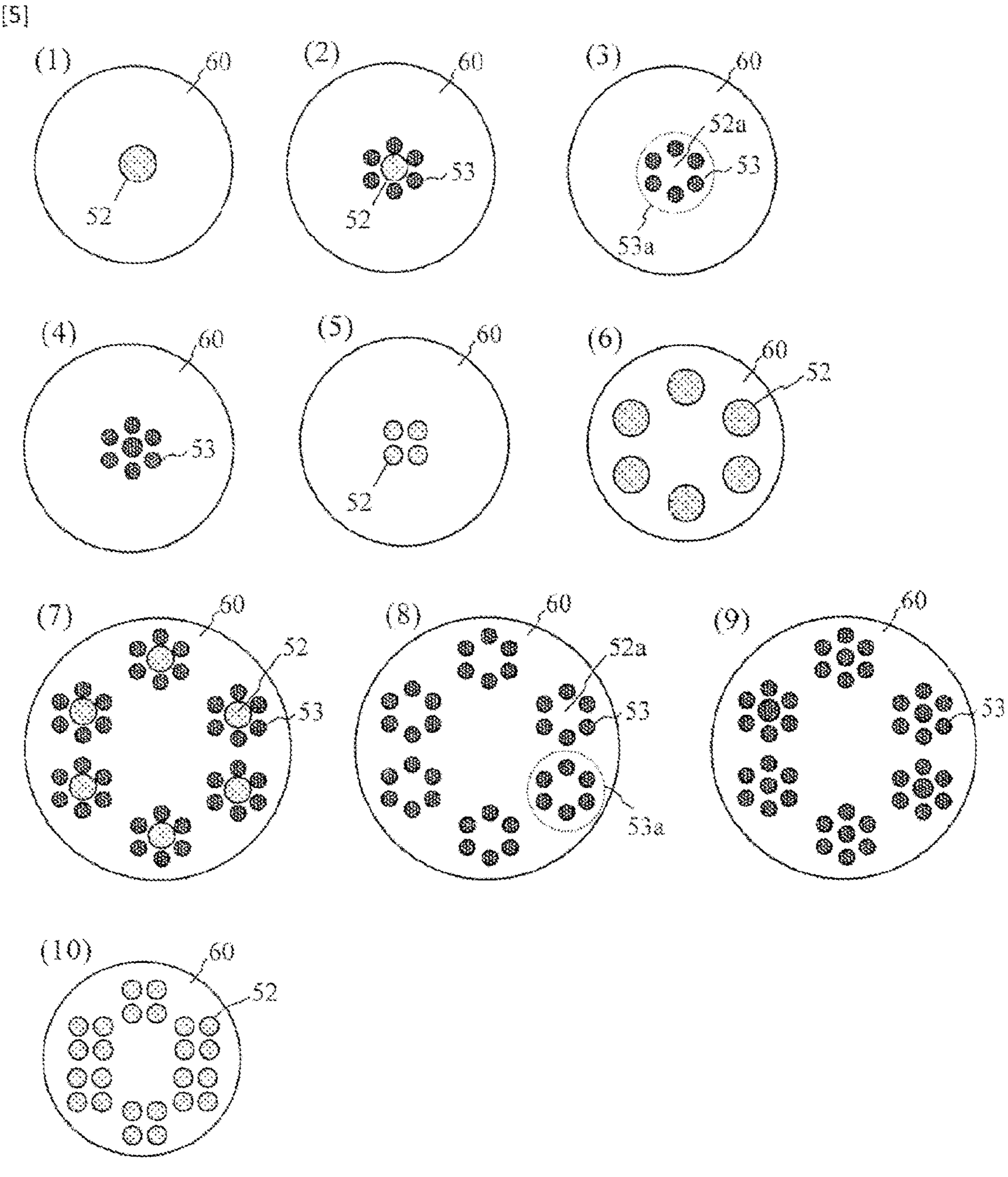
FIG. 5 is a diagram illustrating the optical transmission unit of the ultraviolet optical transmission system according to the present invention.

FIG. 5 is a diagram illustrating a structure of the waveguide region S11. The waveguide region S11 of the optical transmission unit S6 can be a solid core, a hole-assisted core, a hole structure core, a hollow core, or a coupling core.

When the optical transmission unit S6 is a multicore cable, cross-sectional structures of single fibers included in the multicore cable are illustrated in (1) to (5) of the drawing. When the optical transmission unit S6 is a multicore optical fiber or a bundle fiber, cross-sectional structures of the multicore optical fiber are illustrated in (6) to (10) of the drawing.

(1) Solid Core Optical Fiber

The optical fiber has one solid core 52 that has a refractive index greater than that of a cladding 60 in the cladding 60. The term "solid" means "not hollow." The solid core can also be implemented by forming an annular region that has a low refractive index region in the cladding.

(2) Hole-Assisted Optical Fiber

The optical fiber has a solid core 52 and a plurality of holes 53 arranged on the outer periphery of the solid core 52 in the cladding 60. The medium of the holes 53 is air, and the refractive index of air is sufficiently lower than that of quartz-based glass. The hole-assisted optical fiber thus has a function of returning light leaked from the core 52 by bending or the like to the core 52 again and has a small bending loss.

(3) Hole Structure Optical Fiber

The optical fiber has a hole group 53*a* including a plurality of holes 53, and has a refractive index effectively lower than that of a host material (glass or the like) in the cladding 60. This structure is called a photonic crystal fiber. The structure can have a structure that does not have a high-refractive index core of which a refractive index is changed, and thus it is possible to confine light by using a region 52*a* surrounded by the holes 53 as an effective core region. Compared with an optical fiber that has a solid core, the photonic crystal fiber can reduce an influence of absorption and a scattering loss due to an additive in the core, and can implement optical characteristics that cannot be implemented by a solid optical fiber, such as reduction in a bending loss and control of a non-linear effect.

(4) Hollow Core Optical Fiber

In the optical fiber, a core region is formed of air. When the cladding 60 has a photonic bandgap structure formed by the plurality of holes 53 or an anti-resonance structure formed of a thin glass wire, light can be confined in the core region. The optical fiber has a small nonlinear effect, and can supply a high-power or high-energy laser.

(5) Coupling Core Type Optical Fiber

The optical fiber has a plurality of solid cores 52 that have a high refractive index arranged close to each other in the cladding 60. This optical fiber performs optical wave coupling between the solid cores 52 to guide light. The coupling core type optical fiber have an advantage that light corresponding to the number of cores can be dispersed and transmitted, the power can be therefore increased, and efficient sterilization can be performed and an advantage that fiber deterioration due to ultraviolet rays can be alleviated and the lifespan can be extended.

(6) Solid Core Type Multicore Optical Fiber

The optical fiber has a plurality of solid cores 52 that have a high refractive index arranged apart from each other in the cladding 60. The optical fiber guides light in a state where an influence of optical wave coupling can be ignored by sufficiently reducing the optical wave coupling between the solid cores 52. Therefore, the solid core type multicore optical fiber has an advantage that each core can be treated as an independent waveguide.

(7) Hole-Assisted Type Multicore Optical Fiber

The optical fiber has a structure in which the plurality of hole structures and the core regions of the foregoing (2) are arranged in the cladding 60.

(8) Hole Structure Type Multicore Optical Fiber

The optical fiber has a structure in which a plurality of hole structures of the foregoing (3) are arranged in the cladding 60.

(9) Hollow Core Type Multicore Optical Fiber

The optical fiber has a structure in which the plurality of hole structures of the foregoing (4) are arranged in the cladding 60.

(10) Coupling Core Type Multicore Optical Fiber

The optical fiber has a structure in which the plurality of coupling core structures of the foregoing (5) are arranged in the cladding 60.

The cladding diameter S14 may be 125 μm which is widely used for communication or may be an enlarged cladding diameter for implementing many cores, for example, 190 μm.

Figure 6:
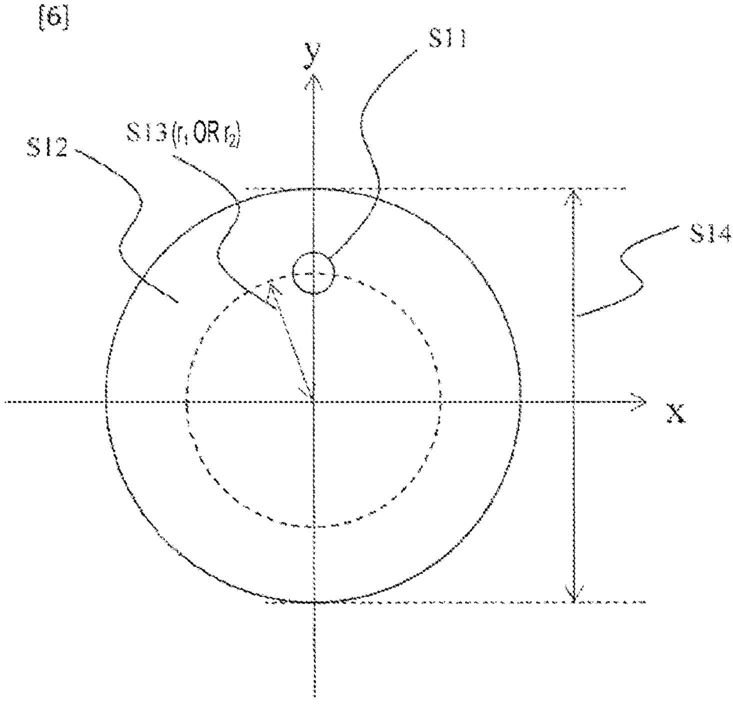
FIG. 6 is a diagram illustrating an optical transmission path between a light source and an optical coupling unit and an optical transmission path between an optical output unit and the optical coupling unit of the ultraviolet optical transmission system according to the present invention.

FIG. 6 is an example of a cross-sectional view illustrating the optical transmission path S4. The reference numerals used in FIG. 6 are the same as the reference numerals in FIG. 4.

In the optical transmission path S4, one waveguide region S11 is arranged, and the center of the waveguide region S11 is arranged on the circumference of a circle that has a radius S13 ($r_1$ or $r_2$, $r_{1=12}$ (for example, in a case where the optical transmission unit S6 is a multicore fiber), or $r_1 \neq r_2$ (for example, in a case where the optical transmission unit S6 is a bundle fiber).) with respect to the center of the optical transmission path S4. It is important to reduce the transmission loss as small as possible, and it is desirable to have a mode field diameter similar to that of the optical transmission unit S6.

Figure 7:
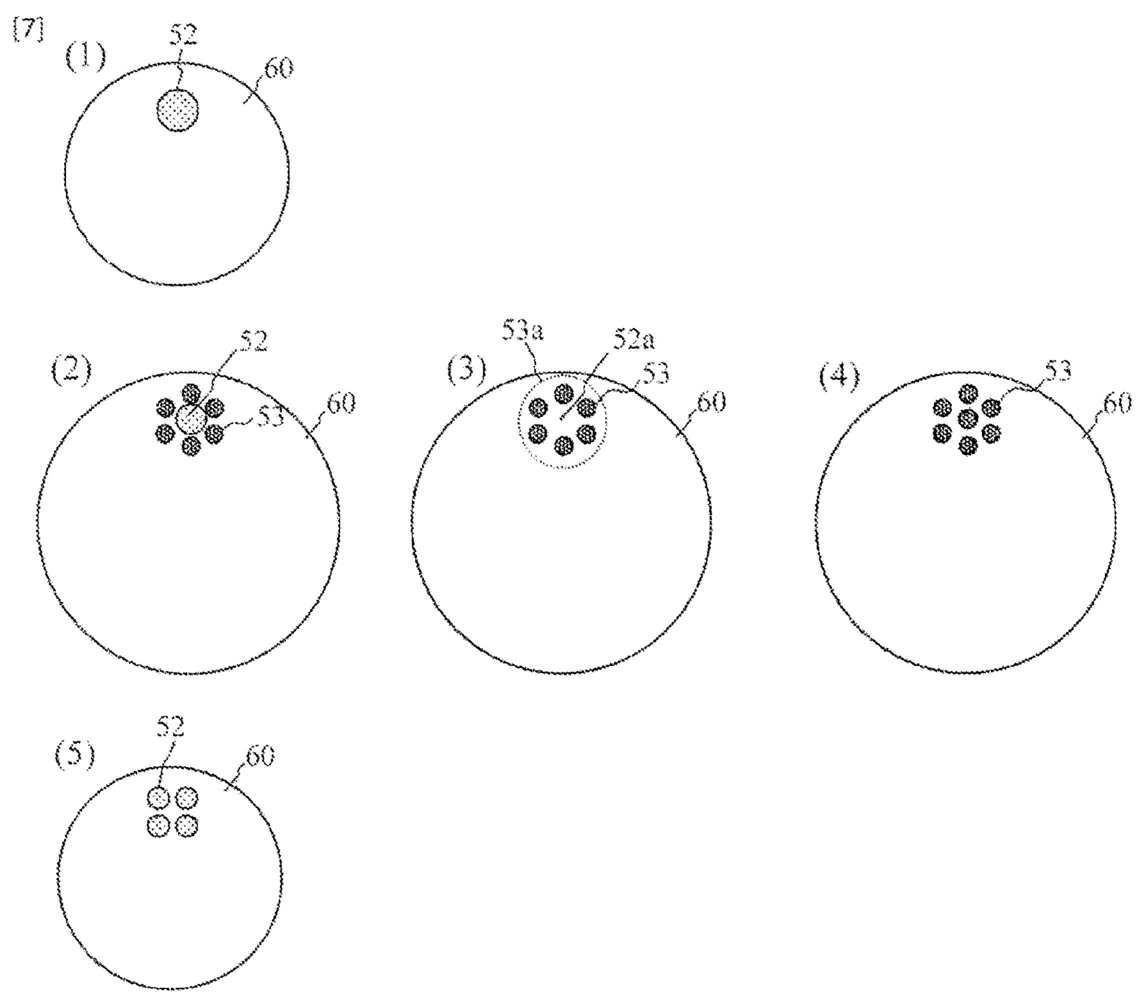
FIG. 7 is a diagram illustrating an optical transmission path between the light source and the optical coupling unit and the optical transmission path between the optical output unit and the optical coupling unit of the ultraviolet optical transmission system according to the present invention.

Like the optical transmission unit S6, in the optical transmission path S4, the waveguide region S11 can be a solid core ((1) of FIG. 7), a hole-assisted core ((2) of FIG. 7), a hole structure core ((3) of FIG. 7), a hollow core ((4) of FIG. 7), or a coupling core ((5) of FIG. 7).

The cladding diameter S14 may be 125 μm which is widely used for communication or may be an enlarged cladding diameter for implementing many cores, for example, 190 μm.

Figure 10:
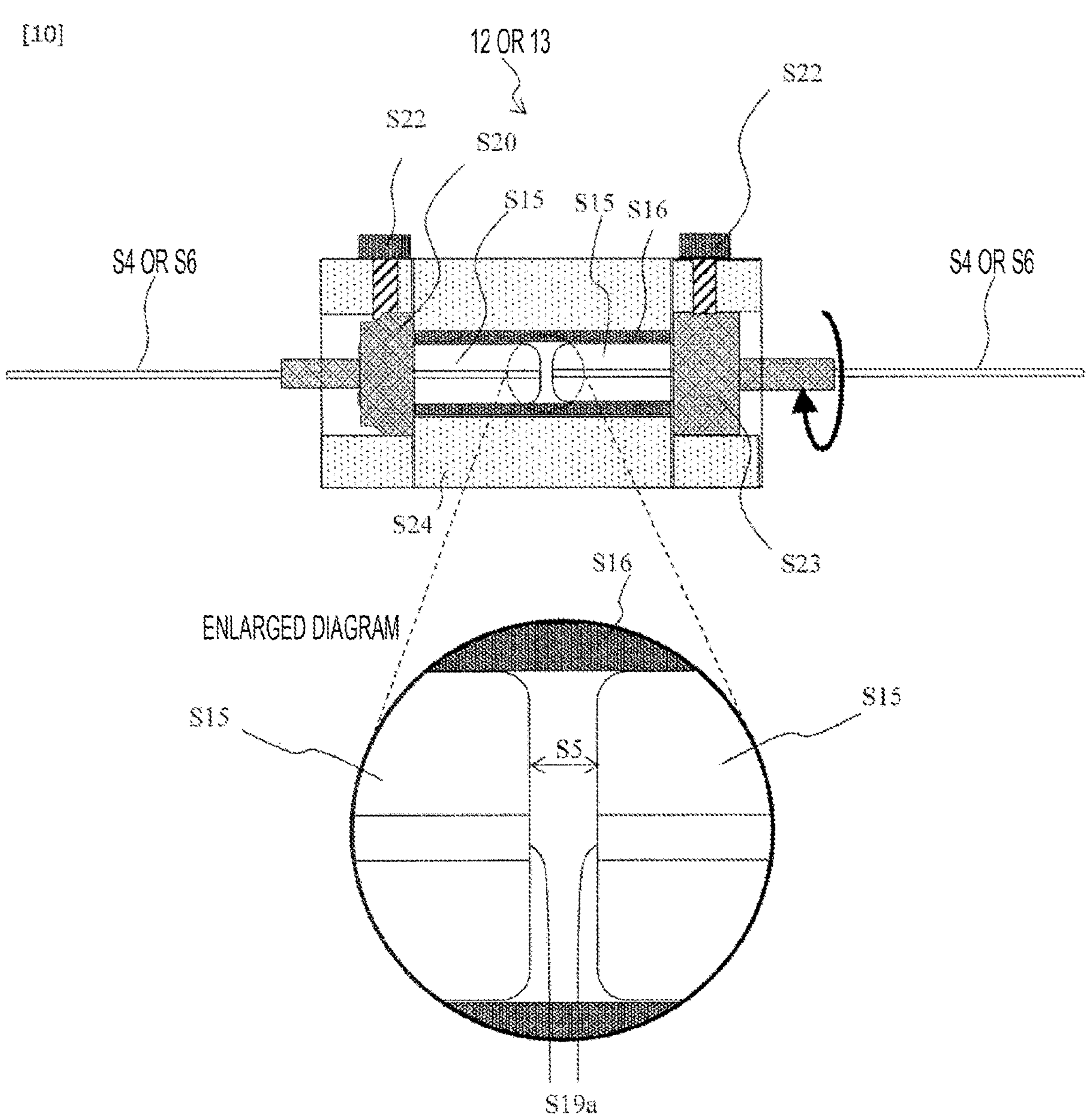
FIG. 10 is a diagram illustrating the optical coupling unit of the ultraviolet optical transmission system according to the present invention.
Figure 11:
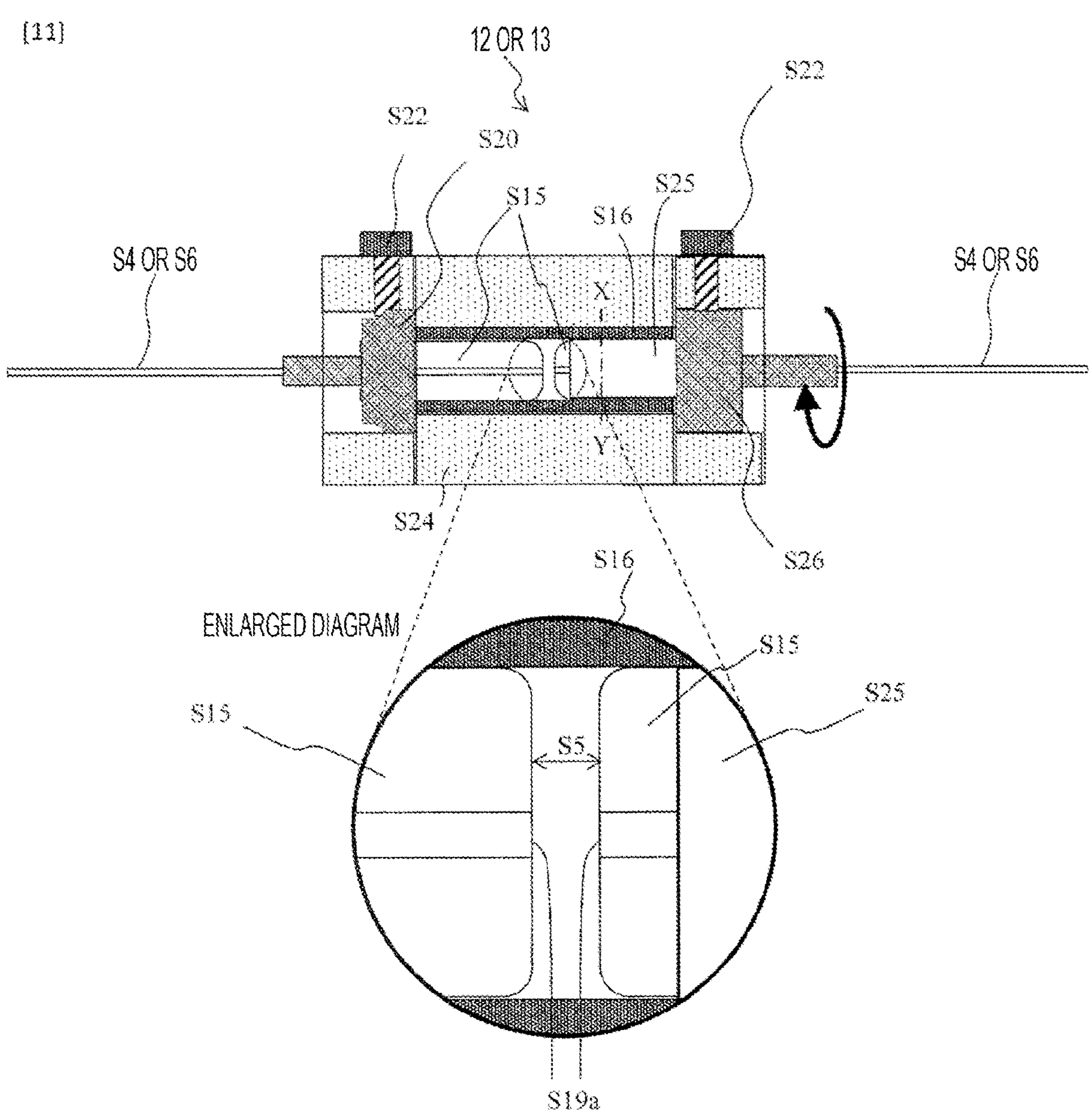
FIG. 11 is a diagram illustrating the optical coupling unit of the ultraviolet optical transmission system according to the present invention.

FIGS. 10 and 11 are diagrams illustrating examples of the structures of the light source side optical coupling unit 12 and the output side optical coupling unit 13. The light source side optical coupling unit 12 and the output side optical coupling unit 13 can have the same structure.

The light source side optical coupling unit 12 has a first revolver structure. The first revolver structure includes:

- a first coupling end surface (for example, S19*a* on the right side of FIGS. 10 and 11) on which one ends of the plurality of optical transmission paths are arranged on a circumference with the radius $r_1$ from a center;
- a second coupling end surface (for example, S19*a* on the left side of FIGS. 10 and 11) on which one end portion outputting the ultraviolet light from the light source 11 is arranged on a circumference with the radius $r_1$ from the center;
- a first ferrule (for example, S15 on the right side of FIGS. 10 and 11) which holds the first coupling end surface;
- a second ferrule (for example, S15 on the left side of FIGS. 10 and 11) which holds the second coupling end surface; and
- a cylindrical first sleeve (S16) into which the first ferrule and the second ferrule are inserted such that the first and second coupling end surfaces face each other.

The output side optical coupling unit 13 has a second revolver structure. The second revolver structure includes:

- a third coupling end surface (for example, S19*a* on the left side of FIGS. 10 and 11) on which the other ends of the plurality of optical transmission paths are arranged on a circumference with the radius $r_2$ from the center;
- a fourth coupling end surface (for example, S19*a* on the right side of FIGS. 10 and 11) in which one end portion to which the ultraviolet light from the optical transmission path is coupled is disposed on a circumference with the radius $r_2$ from the center;
- a third ferrule (for example, S15 on the left side of FIGS. 10 and 11) which holds the third coupling end surface;
- a fourth ferrule (for example, S15 on the right side of FIGS. 10 and 11) which holds the fourth coupling end surface; and
- a cylindrical second sleeve into which the third and fourth ferrules are inserted such that the third and fourth coupling end surfaces face each other.

Each of the left and right ferrules S15 contains the optical transmission paths S4 and S6.

By inserting the left and right ferrules S15 into the sleeve S16, axial misalignment in connection of the optical transmission paths S4 and S6 is prevented.

The sleeve S16 limits the axial misalignment between the left and right ferrules S15 to a certain allowable range, and does not prevent axial rotation of the ferrule containing the optical transmission unit S6. Therefore, the sleeve inner diameter S18 is slightly larger than the ferrule outer diameter S17 by about sub-μm, and a slight clearance (a predetermined gap) of about sub-μm is provided. Here, about sub-μm means 0.1 to 1 μm.

The end surfaces (the first and second coupling end surfaces) of the left and right ferrules S15 are polished and coated with an antireflection film S19 for reducing Fresnel reflection with an air layer. As another method of reducing Fresnel reflection, oblique polishing in which the ferrule end surface is not flat and is polished at a constant angle can be used instead. However, in this case, it is necessary to devise a gap S5, a polishing angle, and a ferrule tip shape to be described below so that the ferrule end surfaces do not come into contact with each other when the ferrule S15 containing the optical transmission unit S6 rotates.

A sum of the lengths of portions of the left and right ferrules S15 inserted into the sleeve S16 is shorter than the length S21 in the sleeve axial direction. In this structure, the gap S5 is provided between the end surfaces of the two optical transmission paths. A minimum value of the gap S5 is guaranteed by the sleeve axially length S21 and the flanges S20 attached to the left and right ferrules. Specifically, the length S21 in the sleeve axial direction is set to be longer than a sum of the lengths of the left and right ferrules S15 protruding from the respective flanges S20, so that the gap S5 can be guaranteed.

Zirconia is generally used for the ferrule S15 and the sleeve S16, but another material can be used as long as the ferrule S15 and the sleeve S16 can be manufactured with high dimensional accuracy.

Figure 8:
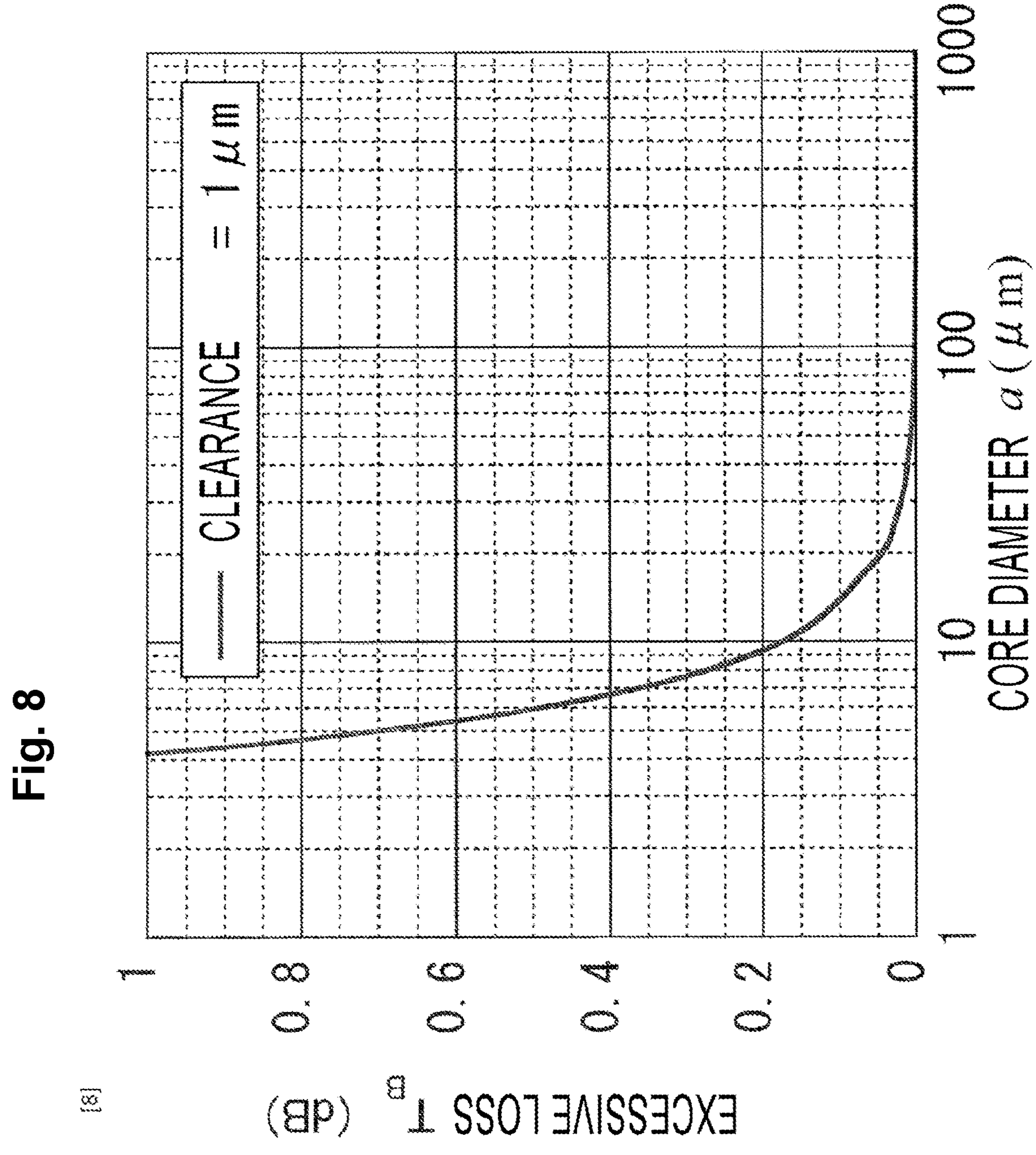
FIG. 8 is a diagram illustrating a relationship of an excessive loss to a clearance between a ferrule outer diameter and a sleeve inner diameter.

FIG. 8 is a diagram illustrating a relationship of an excessive loss to a clearance between a ferrule outer diameter and a sleeve inner diameter. FIG. 8 illustrates an example of the relationship.

In connection of optical fibers, misalignment (axial misalignment) of a fiber core causes an excessive loss. Since an increase in the excessive loss becomes a factor limiting the whole length of the optical path, it is necessary to reduce the misalignment of the fiber core. Here, the clearance between the ferrule outer diameter S17 and the sleeve inner diameter S18 corresponds to axial misalignment of the fiber core.

[Math. 1]

$$T_C = \left(\frac{2w_1w_2}{w_1^2 + w_2^2}\right)^2 \exp\left[1\frac{2C^2}{w_1^2 + w_2^2}\right] \quad (1)$$

Here, W1 and W2 are core radii of the optical transmission path S4 and the optical transmission unit S6, respectively, and C indicates a clearance.

For example, when the ferrule outer diameter S17 and the sleeve inner diameter S18 are processed so that the clearance is 1 μm, the core diameter is about 10 μm, and the maximum excessive loss can be suppressed to about 0.2 dB or less.

Figure 9:
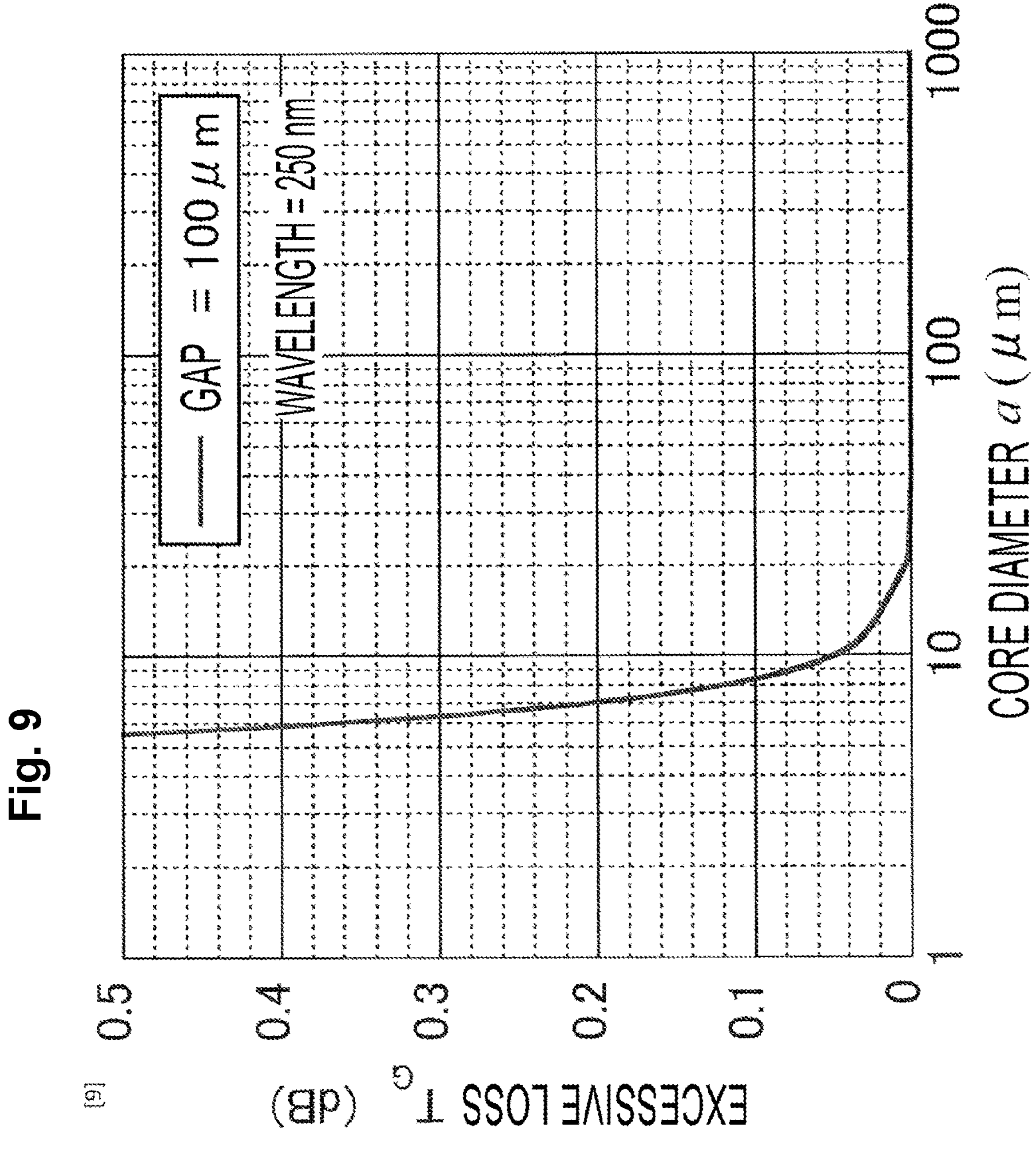
FIG. 9 is a diagram illustrating a relationship of an excessive loss to a gap between coupling end surfaces.

FIG. 9 is a diagram illustrating a relationship of an excessive loss to a gap between coupling end surfaces. FIG. 9 illustrates an example of the relationship.

In the optical connection of the optical fibers, if there is the gap S5 between the fiber end surfaces, a distribution of emitted light is widened, and coupling efficiency of the cores is reduced, which causes an excessive loss.

[Math. 2]

$$T_G = \frac{4\left[4G^2 + \frac{w_1^2}{w_2^2}\right]}{\left[4G^2 + \frac{w_2^2 + w_1^2}{w_2^2}\right]^2 + 4G^2\frac{w_2^2}{w_1^2}} \quad (2)$$

Here, W1 and W2 are core radii of the optical transmission path S4 and the optical transmission unit S6, respectively, and G indicates a gap.

For example, by arranging the left and right ferrules S15 such that the gap S5 between the optical transmission path S4 and the end surface of the optical transmission unit S6 is 100 μm, the core diameter is about 10 μm, and the excessive loss can be suppressed to 0.05 dB.

In order for the ultraviolet light from the light source 11 to pass along one optical transmission path of the optical transmission unit S6 and to be output from the optical output unit 14, it is necessary for the light source side optical coupling unit 12 and the output side optical coupling unit 13 to select the same optical transmission path. Therefore, the ultraviolet optical transmission system 301 further includes a rotation control unit 15 that controls operations of the first revolver structure of the light source side optical coupling unit 12 and the second revolver structure of the output side optical coupling unit 13.

The rotation control unit 15 is connected to the control circuit S9 of the light source side optical coupling unit 12 and the control circuit S9 of the output side optical coupling unit 13, and moves each actuator S8 contained in the optical coupling unit in conjunction with each other via each control circuit. That is, the rotation control unit 15 simultaneously switches waveguide regions of the optical transmission units connected by the two optical coupling units. Specifically, the rotation control unit 15 is configured to:

(1) rotate at least one of the first and second coupling end surfaces in an axial direction of the first sleeve and cause one end portion of the second coupling end surface outputting the ultraviolet light from the light source to face one end portion of one of the optical transmission paths in the first coupling end surface; and (2) rotate at least one of the third and fourth coupling end surfaces in an axial direction of the second sleeve and cause one end portion of the fourth coupling end surface to which the ultraviolet light from the optical transmission path is coupled to face the other end portion of the optical transmission path selected in the first revolver structure on the third coupling end surface.

The ultraviolet optical transmission system 301 may further include a remote controller 16 that can remotely operate the rotation control unit 15. A worker can remotely complete switching between the optical transmission paths by sending a signal from the remote controller 16. The connection of the remote controller 16 and the rotation control unit 15 may be wired or wireless.

Example 1

FIG. 10 is a diagram illustrating an exemplary structure of the optical coupling unit (12, 13).

Of the optical transmission path S4 and the optical transmission unit S6, a bearing S23 is provided on a side that performs axial rotation.

The fixing side ferrule (the left side S15) is attached to the notched flange S20 and is attached to a fixing jig S24 with a fixing screw S22.

On the other hand, the rotation side ferrule (the right side S15) is attached to a flange (not illustrated) provided with the bearing S23.

The bearing S23 is attached to the fixing jig S24 with a fixing screw S22.

The sleeve S16 is contained in the fixing jig S24, and the right and left ferrules S15 are inserted into the sleeve S16 to perform axial alignment.

For example, stainless steel is used for the bearing S23, but another material can be used as long as the bearing S23 can be manufactured with high dimensional accuracy.

Example 2

Figure 12:
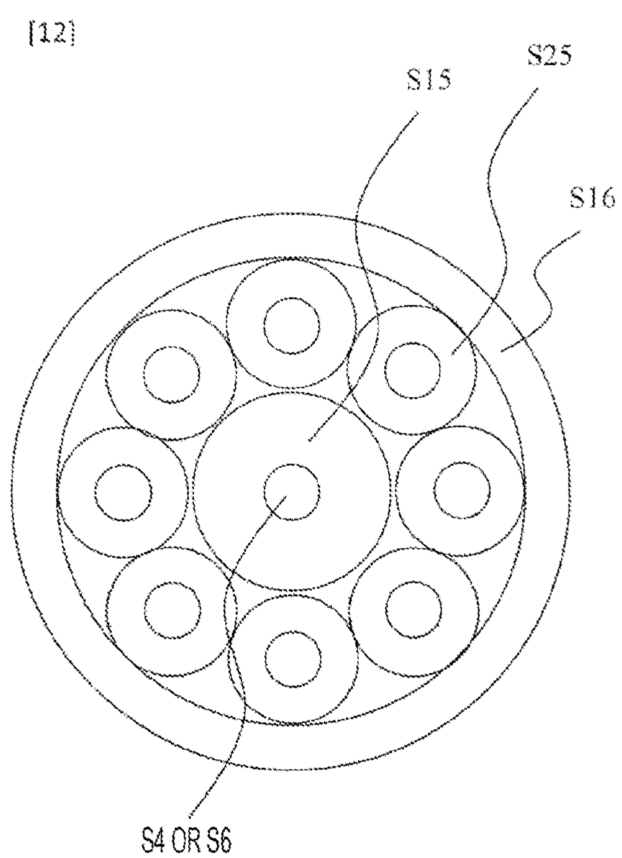
FIG. 12 is a diagram illustrating the optical coupling unit of the ultraviolet optical transmission system according to the present invention.

FIG. 11 is a diagram illustrating another exemplary structure of the optical coupling unit (12, 13). FIG. 12 is a cross-sectional view taken along line X-Y of FIG. 11.

The fixing side ferrule (the left side S15) is attached to the notched flange S20 and is attached to a fixing jig S24 with a fixing screw S22.

On the other hand, the outer diameter of the rotating side ferrule (the right side S15) is smaller than that of the fixed side ferrule (the left side S15), and the bearing S25 is provided between the outer diameter of the ferrule and the inner diameter of the sleeve (see FIG. 12). The bearing S25 is attached to a flange (not illustrated) inside the flange rotation jig S26.

The flange rotation jig S26 is attached to the fixing jig S24 with the fixing screw S22.

The sleeve S16 is contained in the fixing jig S24, and the right and left ferrules S15 are inserted into the sleeve S16 to perform axial alignment.

For example, zirconia is used as a material for the bearing S25, but another material can be used as long as the bearing S25 can be manufactured with high dimensional accuracy.

Supplements

In order to solve the above-described problems, the present invention has the following configurations.

The present invention provides a system in which light with an ultraviolet band is transmitted along an optical transmission path formed of a quartz-based optical fiber, and in which an optical transmission unit is switched by a rotation mechanism in which an optical transmission path of one of an optical coupling unit rotates about an axis, the optical coupling unit including an optical transmission path including a plurality of optical transmission units on the same circumference from a center on an end surface of the optical coupling unit; an optical transmission path in which the optical transmission units are arranged on the same circumference as a circumference on which the plurality of optical transmission units are arranged; two ferrules each containing the two optical transmission paths; and a cylindrical sleeve in which the two ferrules are inserted in a hollow.

A specific configuration is as follows.

Configuration 1

An ultraviolet optical transmission system including:

a light source with an ultraviolet band; an optical transmission path; an optical output unit; an optical coupling unit that couples a light source and the optical transmission path; and an optical coupling unit that couples the optical transmission path and the optical output, wherein the optical coupling unit includes an optical transmission path including a plurality of optical transmission units on the same circumference from a center on a coupling end surface, an optical transmission path in which the optical transmission units are arranged on the same circumference as a circumference on which the plurality of optical transmission units of the optical transmission path are arranged, two ferrules each containing the two optical transmission paths, and a cylindrical sleeve in which the two ferrules are inserted in a hollow, and wherein the optical transmission unit is switched by a rotation mechanism in which one of the optical transmission paths of the optical coupling unit rotates in an axial direction.

Configuration 2

The ultraviolet optical transmission system according to Configuration 1, wherein a predetermined gap is provided between the outer diameters of the two ferrules and the inner diameter of the hollow sleeve.

Configuration 3

The ultraviolet optical transmission system according to Configuration 2, wherein the predetermined gap is 1 μm or less.

Configuration 4

The ultraviolet optical transmission system according to Configuration 1 or 2, wherein, in the two ferrules, a sum of lengths of portions inserted into the hollow sleeve is shorter than a whole length of the hollow sleeve, and wherein, in the optical coupling unit, a gap is provided between coupling end surfaces of the two optical transmission paths.

Configuration 5

The ultraviolet optical transmission system according to Configuration 4, wherein the gap is 100 μm or less.

Configuration 6

The ultraviolet optical transmission system according to any one of Configurations 1 to 5, wherein the optical transmission path including the plurality of optical transmission units on the same circumference from the center in the coupling end surface is an optical fiber having at least two or more waveguide regions, and is a multicore optical fiber selectively using the waveguide regions.

Configuration 7

The ultraviolet optical transmission system according to any one of Configurations 1 to 5, wherein the optical transmission path including the plurality of optical transmission units on the same circumference from the center in the coupling end surface is an optical fiber having at least two or more waveguide regions, and is a bundle fiber selectively using the waveguide regions.

Configuration 8

The ultraviolet optical transmission system according to any one of Configurations 1 to 5, wherein the optical transmission path including the plurality of optical transmission units on the same circumference from the center on the coupling end surface is a multicore cable in which at least two or more single fibers are bundled. [Configuration 9]

The ultraviolet optical transmission system according to any one of Configurations 6 to 8, wherein, in the optical transmission path, the waveguide region includes one independent core.

Configuration 10

The ultraviolet optical transmission system according to any one of configurations 6 to 8, wherein, in the optical transmission path, the waveguide region includes at least two or more cores having inter-core coupling.

Configuration 11

The ultraviolet optical transmission system according to any one of Configurations 6 to 8, wherein, in the optical transmission path, the waveguide region is formed by one independent core and a plurality of holes arranged at equal intervals on an outer circumference of the one core.

Configuration 12

The ultraviolet optical transmission system according to any one of Configurations 6 to 8, wherein, in the optical transmission path, the waveguide region includes a core surrounded by a plurality of holes.

Configuration 13

The ultraviolet optical transmission system according to any one of Configurations 1 to 12, wherein a bearing is provided while the optical coupling unit performs axial rotation.

Configuration 14

The ultraviolet optical transmission system according to any one of Configurations 1 to 13, further including an actuator configured to rotate the rotation mechanism at a constant angle step and stop at an arbitrary angle step.

With this configuration, when a quartz-based optical fiber degraded due to an increase in an absorption loss due to a light-induced defect after transmitting light in an ultraviolet band is exchanged, the optical transmission unit can be switched in a state where the end surface of the optical coupling unit is inserted into the hollow sleeve, that is, a state where there is no influence on eyes and skin.

Accordingly, according to the present invention, in the optical transmission path including the quartz-based optical fiber that transmits the light with the ultraviolet band, it is not necessary to block the light source when the deteriorated optical transmission unit is exchanged with a new optical transmission unit. Therefore, the optical transmission unit can be exchanged safely and easily. According to the present invention, since a new optical transmission unit is provided in advance, it is possible to eliminate the need for on-site work when the optical transmission unit is exchanged by providing a remote control mechanism.

REFERENCE SIGNS LIST

11 Light source
12 Light source side optical coupling unit
13 Output side optical coupling unit
14 Optical output unit
15 Rotation control unit
16 Remote control unit
301 Ultraviolet optical transmission system
S1 Light source unit
S2 Optical system
S3 Rotation stopping mechanism
S4 Optical transmission path
S5 Gap
S6 Optical transmission path
S7 Free-rotation mechanism
S8 Actuator
S9 Control circuit
S10 Irradiation target
S11 Waveguide region
S12 Cladding
S13 Core arrangement radius
S14 Optical fiber cladding diameter
S15 Ferrule S16 Sleeve
S17 Ferrule outer diameter
S18 Sleeve inner diameter
S19 Antireflection film
S20 Flange
S21 Sleeve axially length
S22 Fixing screw
S23 Bearing
S24 Fixing jig
S25 Bearing
S26 Flange rotation jig

The invention claimed is:

1. An ultraviolet optical transmission system comprising:
a light source configured to generate ultraviolet light having an ultraviolet band;
an optical transmission unit configured to have a plurality of optical transmission paths along which the ultraviolet light propagates;
an optical output unit configured to output the ultraviolet light to an exterior of the ultraviolet optical transmission system;
a light source side optical coupling unit configured to connect the light source to the optical transmission unit; and
an output side optical coupling unit configured to connect the optical transmission unit to the optical output unit,
wherein the light source side optical coupling unit comprises a first revolver structure configured to couple the ultraviolet light from the light source to an optical transmission path among the plurality of optical transmission paths of the optical transmission unit, and
wherein the output side optical coupling unit has a second revolver structure configured to couple the ultraviolet light from the optical transmission path along which the ultraviolet light propagates to the optical output unit,
wherein the optical transmission unit is a bundle fiber obtained by bundling a plurality of multicore optical fibers, and a waveguide region of each multicore optical fiber included in the bundle fiber is used as a different optical transmission path.

2. The ultraviolet optical transmission system according to claim 1,
wherein the first revolver structure includes:
a first coupling end surface on which first ends of the plurality of optical transmission paths are arranged on a first circumference with a radius of r1 from a first center;
a second coupling end surface on which a first end portion outputting the ultraviolet light from the light source is arranged on a second circumference with the radius of r1 from a second center;
a first ferrule configured to hold the first coupling end surface;
a second ferrule configured to hold the second coupling end surface; and
a cylindrical first sleeve into which the first ferrule and the second ferrule are inserted such that the first and second coupling end surfaces face each other,
wherein the second revolver structure includes:
a third coupling end surface on which second ends of the plurality of optical transmission paths are arranged on a third circumference with a radius of r2 from a third center;
a fourth coupling end surface on which a second end portion to which the ultraviolet light from the optical transmission path is coupled is arranged on a fourth circumference with the radius of r2 from a fourth center;
a third ferrule configured to hold the third coupling end surface;
a fourth ferrule configured to hold the fourth coupling end surface; and
a cylindrical second sleeve into which the third ferrule and the fourth ferrule are inserted such that the third and fourth coupling end surfaces face each other, and
wherein the ultraviolet optical transmission system further comprises a rotation control unit configured to rotate at least one of the first and second coupling end surfaces in an axial direction of the first sleeve to cause the first end portion on the second coupling end surface outputting the ultraviolet light from the light source and a first end portion of the optical transmission path among the plurality of optical transmission paths in the first coupling end surface to face each other, and configured to rotate at least one of the third and fourth coupling end surfaces in an axial direction of the second sleeve and cause the second end portion of the fourth coupling end surface to which the ultraviolet light from the optical transmission path is coupled and a second end portion of the optical transmission path selected in the first revolver structure on the third coupling end surface to face each other.

3. The ultraviolet optical transmission system according to claim 2, wherein a gap is provided between the first and second coupling end surfaces and between the third and fourth coupling end surfaces.

4. The ultraviolet optical transmission system according to claim 2, further comprising a remote controller capable of remotely operating the rotation control unit.

5. The ultraviolet optical transmission system according to claim 1, wherein the waveguide region of the optical transmission unit is a solid core, a hole-assisted core, a hole structure core, a hollow core, or a coupling core.

* * * * *